US008374643B2

(12) United States Patent
Shatsky

(10) Patent No.: US 8,374,643 B2
(45) Date of Patent: Feb. 12, 2013

(54) SYSTEMS AND METHODS FOR FACILITATING PUSH-TO-TALK (PTT) COMMUNICATIONS USING SIP-BASED MESSAGING

(75) Inventor: Alexander Shatsky, Waterloo (CA)

(73) Assignee: Research In Motion Limited, Waterloo (CA)

( * ) Notice: Subject to any disclaimer, the term of this patent is extended or adjusted under 35 U.S.C. 154(b) by 722 days.

(21) Appl. No.: 12/392,177

(22) Filed: Feb. 25, 2009

(65) Prior Publication Data

US 2010/0216500 A1 Aug. 26, 2010

(51) Int. Cl.
*H04B 7/00* (2006.01)
(52) U.S. Cl. ............... 455/519; 455/426.1; 455/518; 370/260
(58) Field of Classification Search .......... 455/428, 455/554.1, 555, 560, 410, 411, 412.1, 412.2, 455/414.1, 426.1, 445, 466; 370/219, 401, 370/310.2, 328–338, 352–356, 410, 493–496, 370/522
See application file for complete search history.

(56) References Cited

U.S. PATENT DOCUMENTS

| 7,280,502 | B2 * | 10/2007 | Allen et al. ............... 370/329 |
| 2004/0224710 | A1 * | 11/2004 | Koskelainen et al. ......... 455/518 |
| 2005/0190740 | A1 | 9/2005 | Zhao et al. |
| 2005/0261015 | A1 | 11/2005 | Schwagmann et al. |
| 2006/0178138 | A1 | 8/2006 | Ostroff et al. |
| 2006/0211438 | A1 | 9/2006 | Sung et al. |
| 2006/0235981 | A1 | 10/2006 | Westman et al. |
| 2006/0270430 | A1 * | 11/2006 | Milstein et al. ............... 455/518 |
| 2007/0004438 | A1 | 1/2007 | Brusilovsky et al. |
| 2007/0208807 | A1 | 9/2007 | Jagannathan et al. |
| 2008/0274762 | A1 * | 11/2008 | Wu et al. ....................... 455/518 |

FOREIGN PATENT DOCUMENTS

| WO | 2005/107095 | 11/2005 |
| WO | 2008/073009 | 6/2008 |

OTHER PUBLICATIONS

Berger, Stefan; Acharya, Arup; Narayanaswami, Chandra; IBM Research Report; Unleashing the Power of Wearable Devices in a SIP Infrastructure; RC23288 (W0408-026) Aug. 6, 2004.
O'Regan, Eoin; Pesch, Dirk; Adaptive Wireless Systems Group; Cork Institute of Technology Ireland; Performance Estimation of a SIP based Push-to-Talk Service for 3G Networks.
Das, Sanjay Kanti; Helsinki University of Technology; Department of Electrical and Communication Engineering Communication Laboratory; Feasiblity study of IP Multimedia Subsystem (IMS) based Push-to-Talk over Cellular (PoC) for Public Safety and Security communications.

(Continued)

*Primary Examiner* — Shawki Ismail
*Assistant Examiner* — Christopher Lo
(74) *Attorney, Agent, or Firm* — Ridout & Maybee LLP

(57) ABSTRACT

A method of facilitating push-to-talk (PTT) communications between a server device and a client device using SIP-based messaging, the server device being in communication with a media server. The method includes receiving in the server device from the client device a SUBSCRIBE message for subscription to a push-to-talk group, the SUBSCRIBE message including media information of the client device, storing in the server device the media information of the client device, and sending from the server device to the client device a NOTIFY message, the NOTIFY message including media information of the media server for storage by the client device.

20 Claims, 10 Drawing Sheets

OTHER PUBLICATIONS

Ahonen, Elina; Helsinki University of Technology; Department of Electrical and Communications Engineering; Implementing a Multi-access Push to Talk System and Analysing User Experience; Espoo, Oct. 16, 2007.

Open Mobile Alliance; Push to talk over Cellular 2 Requirements; Candidate Version 2.0—Oct. 2, 2007.

Tech Tracker; Steven J. Schuchart Jr.; Optical Illusions; Blu-ray and HD-DVD are the future for data and video, but industry infighting and lack of a single standard may slow broad adoption; 2007.

Akshai Parthasarathy; Push to Talk over Cellular (PoC) server; Dec. 10, 2004.

* cited by examiner

132 ⟶

207 ⟶

SUBSCRIBE sip:1000@sip.rim.com SIP/2.0
Max-Forwards: 70
To: <sip:1000@sip.rim.com>
From: <sip:1000@sip.rim.com>;tag=726sdf234
Via: SIP/2.0/UDP 192.168.1.100;branch=z9hG4bKkjs987987
Call-ID: 723453453453456@sip.rim.net
CSeq: 726 SUBSCRIBE
Contact: <sip:1000@sip.rim.com>
203 ⟶ Event: push-to-talk
Accept: application/push-to-talk
204 ⟶ Push-To-Talk-Group: 1;state=idle
208 ⟶ Expires: 3600
Content-Type: application/sdp ⟵ 206
Content-Length: 210 v=0
o=UA-PTT-session 53677 67439 IN IP4 192.168.1.100
s=PTT Call
c=IN IP4 192.168.1.100
t=0 0
m=audio 50000 RTP/AVP 0 19 ⟶ 212
c=IN IP4 192.168.1.100
a=rtpmap:0 PCMU/8000
a=rtpmap:19 CN/8000
a=ptime:20

NOTIFY sip:1000@sip.rim.com SIP/2.0
Max-Forwards: 70
To: <sip:1000@sip.rim.com>
From: <sip:1000@sip.rim.com>;tag=726sdf2341
Via: SIP/2.0/UDP 192.168.1.101;branch=z9hG4bKkjs9879871
Call-ID: 7234534534534561@sip.rim.net
CSeq: 727 NOTIFY
Contact: <sip:1000@sip.rim.com>
228 — Event: push-to-talk
Accept: application/push-to-talk
Push-To-Talk-Group: 1;state=idle
232 — Expires: 2900
Content-Type: application/sdp — 230
Content-Length: 208
} 226 v=0
o=Media-Server-PTT-session 3677 439 IN IP4 192.168.1.102
s=PTT Call
c=IN IP4 192.168.1.102
t=0 0
m=audio 30000 RTP/AVP 0 19 — 222
c=IN IP4 192.168.1.102
a=rtpmap:0 PCMU/8000
a=rtpmap:19 CN/8000
a=ptime:20
} 224

```
SUBSCRIBE sip:1000@sip.rim.com SIP/2.0
Max-Forwards: 70
To: <sip:1000@sip.rim.com>
From: <sip:1000@sip.rim.com>;tag=726sdf2342
Via: SIP/2.0/UDP 192.168.1.100;branch=z9hG4bKkjs9879872
Call-ID: 7234534534534562@sip.rim.net
CSeq: 728 SUBSCRIBE
Contact: <sip:1000@sip.rim.com>
Event: push-to-talk
Accept: application/push-to-talk
Push-To-Talk-Group: 1;state=active
Expires: 3600
Content-Length: 0
```

NOTIFY sip:1000@sip.rim.com SIP/2.0
Max-Forwards: 70
To: <sip:1000@sip.rim.com>
From: <sip:1000@sip.rim.com>;tag=726sdf23413
Via: SIP/2.0/UDP 192.168.1.101;branch=z9hG4bKkjs98798713
Call-ID: 72345345345345613@sip.rim.net
CSeq: 729 NOTIFY
Contact: <sip:1000@sip.rim.com>
Event: push-to-talk
Accept: application/push-to-talk
Push-To-Talk-Group: 1;state=active
Expires: 2500
Content-Length: 0        ↘262

SYSTEMS AND METHODS FOR FACILITATING PUSH-TO-TALK (PTT) COMMUNICATIONS USING SIP-BASED MESSAGING

FIELD

The present application relates to push-to-talk systems and methods, and in particular to implementing push-to-talk using Session Initiation Protocol (SIP).

BACKGROUND

Push-to-talk (PTT) generally refers to real-time direct one-to-one and one-to-group voice communication service, which may occur in the cellular, Public Switch Telephone Networks (PSTN) and Internet networks. PTT calls can be directed to both individuals and talk groups. In a PTT call, the call connection is initiated by an originator device while the receiver typically does not have to "answer" the call.

PTT calls are one-way communications (half-duplex), which means that while one person speaks the others listen. In a PTT conversation, users typically no longer need to make several calls to coordinate with a group.

PTT service users are typically engaged in some other activity than a telephone call, and they listen to the group traffic during their activity. A user is usually contacted by receiving a PTT call from a member of the PTT group and can respond to the PTT group with a push of a key.

Session Initiation Protocol (SIP) is a protocol which is based on a request-response model. SIP leaves open the particular implementation of the desired functionality, and for example does not provide for specific implementation of PTT. As the interpretation remains open, some implementations of PTT using SIP may lead to inefficiencies.

For example, in some conventional systems implementing PTT using SIP, media parameters are negotiated and communicated only once the PTT call is initiated by a user. This wastes resources and time between when the user actually initiates the PTT call and when the system connects the user to the receiving units. Call lags may occur each time a user initiates a PTT call. Further, such inefficiencies become magnified when the PTT group involves a large number of parties.

Other difficulties with existing conventional systems will be apparent to those skilled in the art in view of the detailed description below.

BRIEF DESCRIPTION OF THE DRAWINGS

Reference will now be made, by way of example, to the accompanying drawings which show example embodiments, and in which:

FIG. 9 shows an example message from the client device to the server device in the subscription procedure of FIG. 8;

FIG. 10 shows an example message from the sever device to the client device in the subscription procedure of FIG. 8;

FIG. 11 shows an example message from an originator client device initiating a push-to-talk session within the push-to-talk procedure of FIG. 7; and FIG. 12 shows an example message from a server device to receiving client devices within the push-to-talk procedure of FIG. 7.

Similar reference numerals may have been used in different figures to denote similar components.

DESCRIPTION OF EXAMPLE EMBODIMENTS

Figure 1:
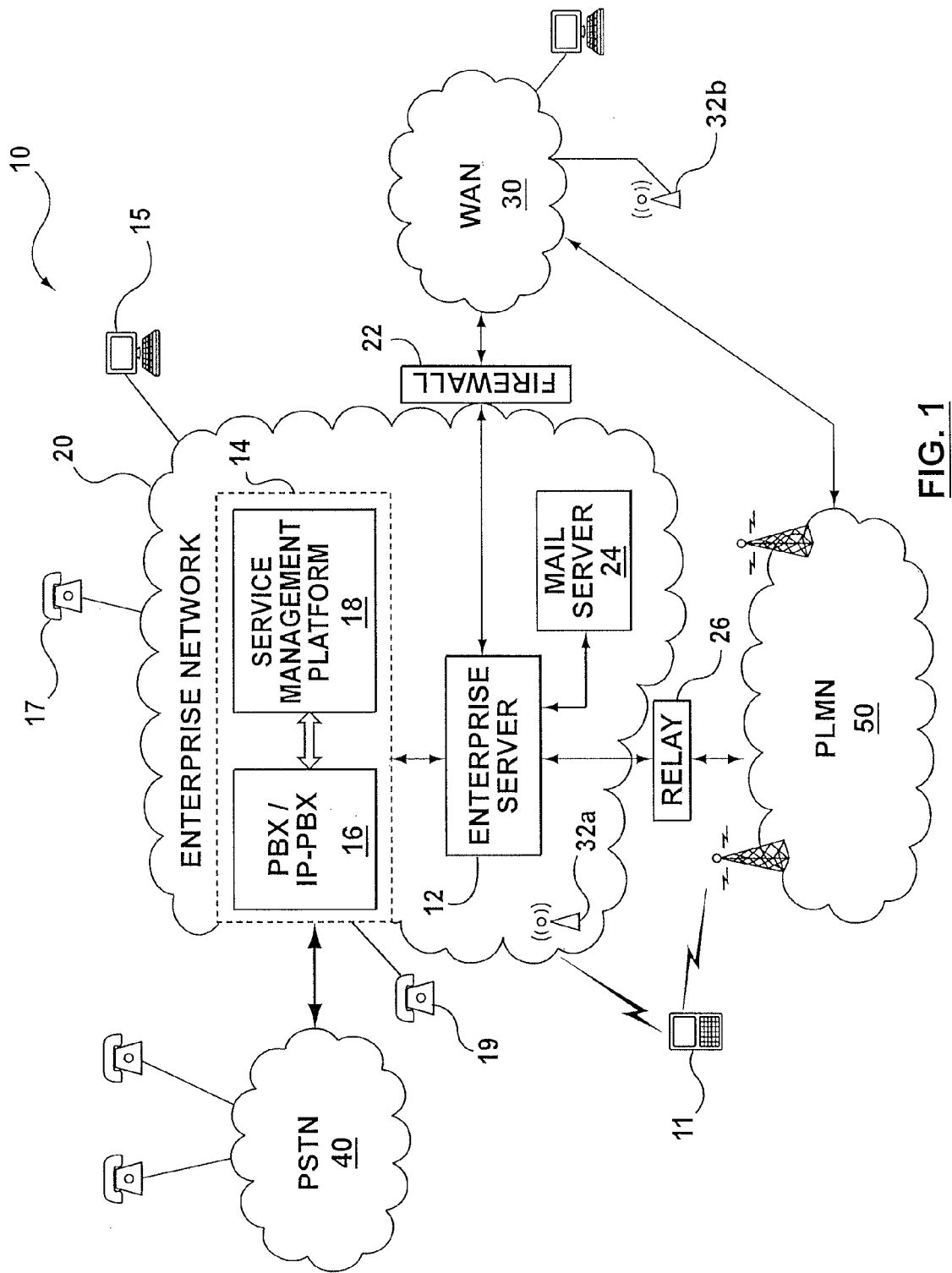
FIG. 1 shows, in block diagram form, an example system for managing enterprise-related mobile calls, including an enterprise communications platform, to which example embodiments may be applied.

In one aspect, there is provided a method of facilitating push-to-talk (PTT) communications between a server device and a client device using SIP-based messaging, the server device being in communication with a media server. The method includes: receiving in the server device from the client device a SUBSCRIBE message for subscription to a push-to-talk group, the SUBSCRIBE message including media information of the client device, storing in the server device the media information of the client device, and initiating, based on receipt in the server device of a second SUBSCRIBE message for initiating a push-to-talk session, a media session between the media server and the client device using the stored media information.

In another aspect, there is provided a method of facilitating push-to-talk (PTT) communications between a server device and a client device using SIP-based messaging, the server device being in communication with a media server. The method includes: receiving in the server device from the client device a SUBSCRIBE message for subscription to a push-to-talk group, sending from the server device to the client device a NOTIFY message, the NOTIFY message including media information of the media server for storage by the client device, and initiating, based on receipt in the server device of a second SUBSCRIBE message for initiating a push-to-talk session, a media session between the media server and the client device using the stored media information.

In yet another aspect, there is provided a server device for facilitating push-to-talk (PTT) communications using SIP-based messaging. The server device includes a memory, a controller for accessing the memory, a communications module in communications with the controller for communicating with a media server and a client device. The controller is configured to: receive from the client device a SUBSCRIBE message for subscription to a push-to-talk group, the SUBSCRIBE message including media information of the client device, store in memory the media information of the client device, send to the client device a NOTIFY message, the NOTIFY message including media information of the media server for storage by the client device, and initiate, based on receipt of a second SUBSCRIBE message for initiating a push-to-talk session, a media session between the media server and the client device using the stored media information.

In yet another aspect, there is provided a system for facilitating push-to-talk (PTT) communications using SIP-based messaging. The system includes a media server, a server device in communication with the media server, and at least one PTT receiving client devices, each for sending to the server device a SUBSCRIBE message for subscription to a push-to-talk group, the SUBSCRIBE message including media information of each of the PTT receiving client devices. The system further includes a PTT originator client device for sending to the server device a SUBSCRIBE message for subscription to a push-to-talk group. The server device is configured to: store the media information of the PTT-receiving client devices, and send to the PTT originator client device a NOTIFY message, the NOTIFY message including media information of the media server. The PTT originator client device is configured to store the media information of the media server. The server device is further configured to, upon receipt in the server device from the PTT originator client device of a second SUBSCRIBE message for initiating a push-to-talk session, initiate a media session between the media server and the client devices using the stored media information.

Other aspects will be apparent to those of ordinary skill in the art from a review of the following detailed description in conjunction with the drawings.

The present application relates to the control and management of push-to-talk (PTT) communications. Although reference may be made to "calls" and "talk" in the description of example embodiments below, it will be appreciated that the described systems and methods are applicable to session-based communications in general and not limited to voice calls. Reference to calls may for example include voice calls as well as media sessions which may for example include video and/or audio.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch exchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
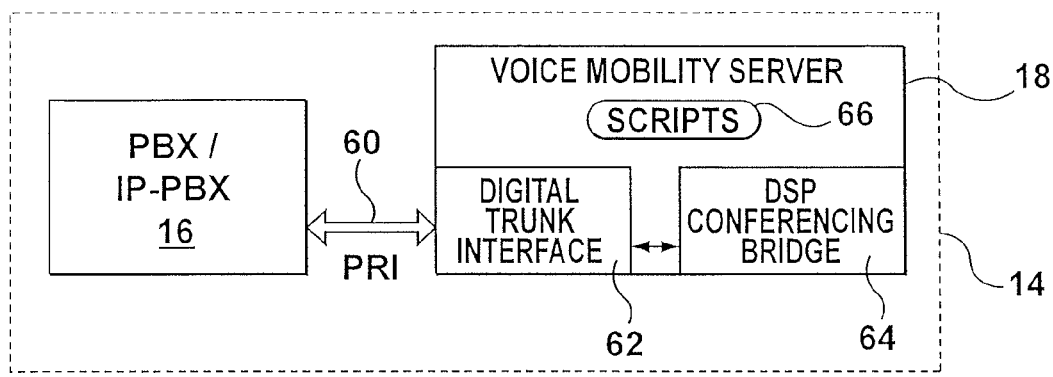
FIG. 2 shows, in block diagram form, further details of an embodiment of the enterprise communications platform.
Figure 3:
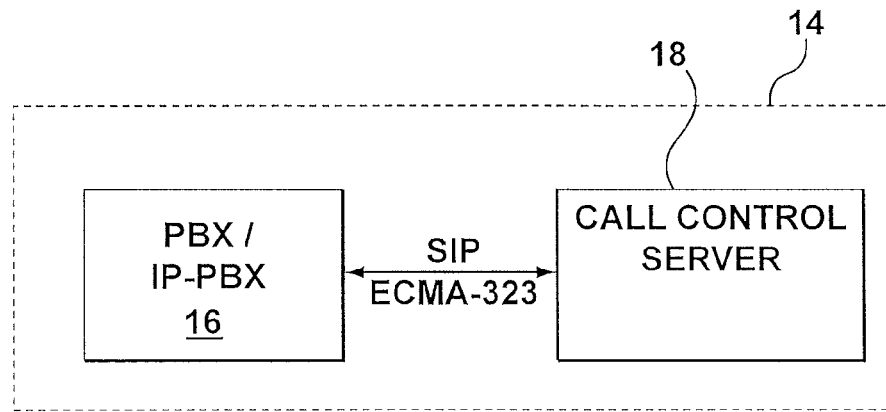
FIG. 3 shows another embodiment of the enterprise communications platform.
Figure 4:
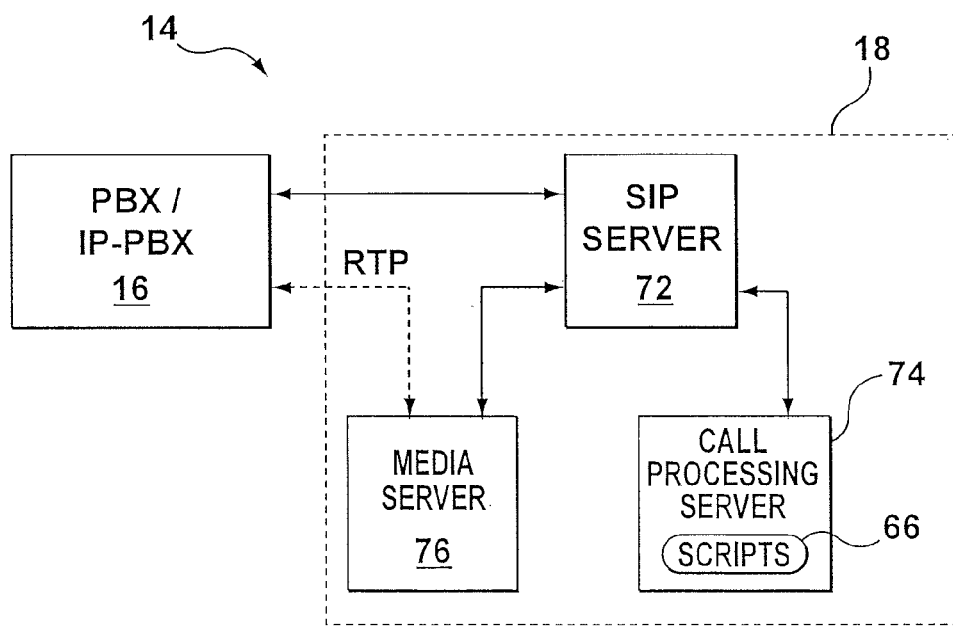
FIG. 4 shows yet another embodiment of the enterprise communications platform.

Reference is now made to FIGS. 2 to 4, which show example embodiments of the enterprise communications system 14. FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Figure 5:
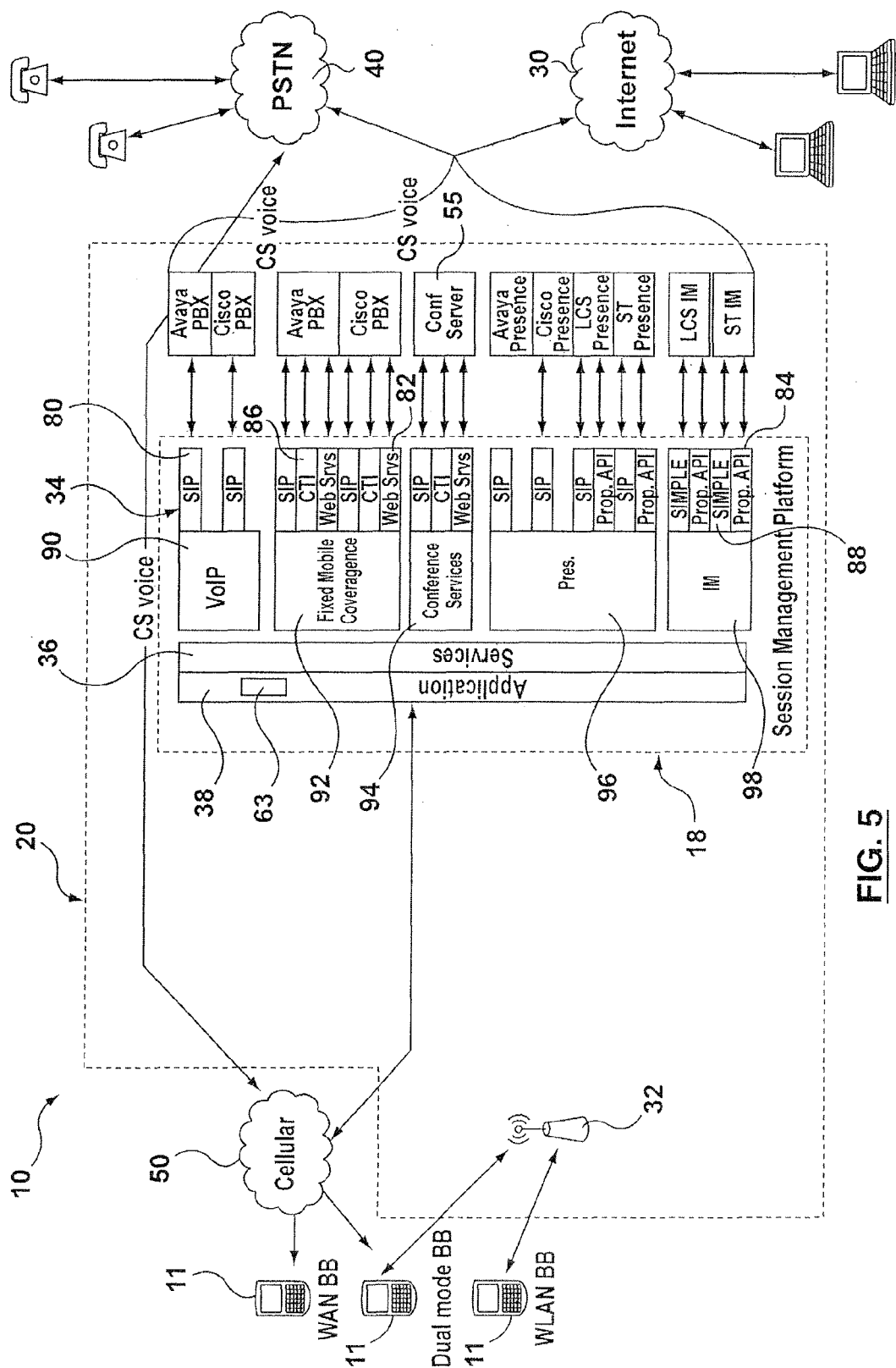
FIG. 5 shows further details of the enterprise communications platform of FIG. 3.

Reference is now made to FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). SIP is defined in J. Rosenberg et al., "RFC 3261—Session Initiation Protocol" (June 2002), the contents of which are herein incorporated by reference. Other protocols, extensions, and standards related to SIP may be implemented and referenced, as appropriate. For example, Session Description Protocol (SDP), as described herein, is defined in RFC 3264, and is herein incorporated by reference.

The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Figure 6:
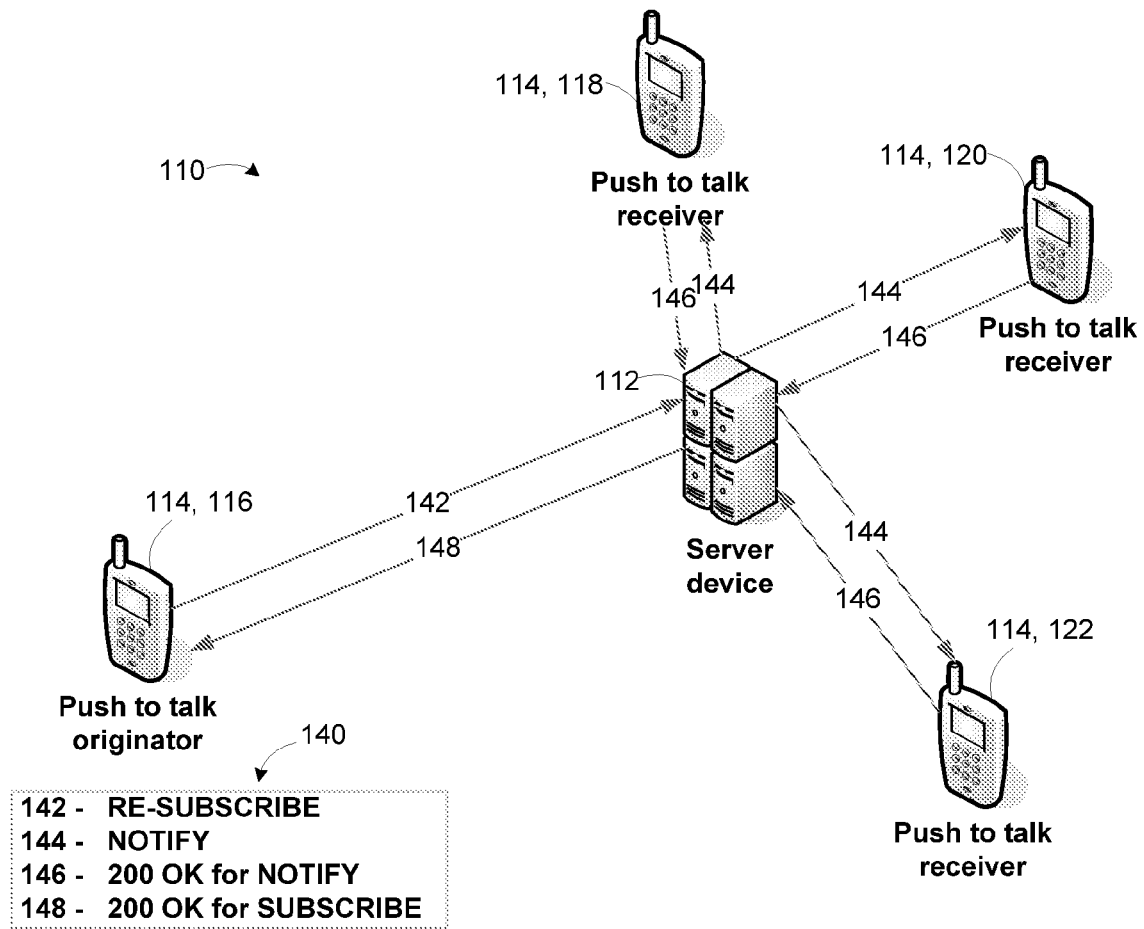
FIG. 6 shows, in block diagram form, an example push-to-talk system and associated push-to-talk procedure implemented by the system of FIG. 1.

Reference is now made to FIG. 6, which shows, in block diagram form, an example PTT system, generally designated 110, for implementing a push-to-talk (PTT) procedure 140 in accordance with example embodiments. As shown, the PTT system 110 includes a PTT server device 112 in communication with a number of PTT client devices 114, illustrated as one PTT originator 116 and a plurality of PTT receivers 118, 120, 122. The client devices 114 may collectively form a PTT group. The PTT receivers 118, 120, 122 may also sometimes be referred to as terminating devices.

The server device 112 includes a controller and a memory for storage of, among other items, the media information of client devices 114 which subscribe to a push-to-talk group. The server device 112 includes a communications module or submodule for communicating with other devices. The server device 112 may for example be part of the call control server or SMP 18 (FIGS. 1-5). The server device 112 may further be part of the enterprise or business system 20 (FIG. 1). The server device 112 may include or be coupled to the media server 76 (FIG. 4), wherein the server device 112 controls the media handling of the media server 76.

Although the client devices 114 are illustrated as handheld mobile communication devices (such as a smart phone, cellular phone, soft phone, dual-mode phone, etc.), the client devices may be any device configured with the functionality described herein, and may for example include computer devices, relays, proxies, gateways and any appropriate User Agents (as defined in SIP).

Figure 7:
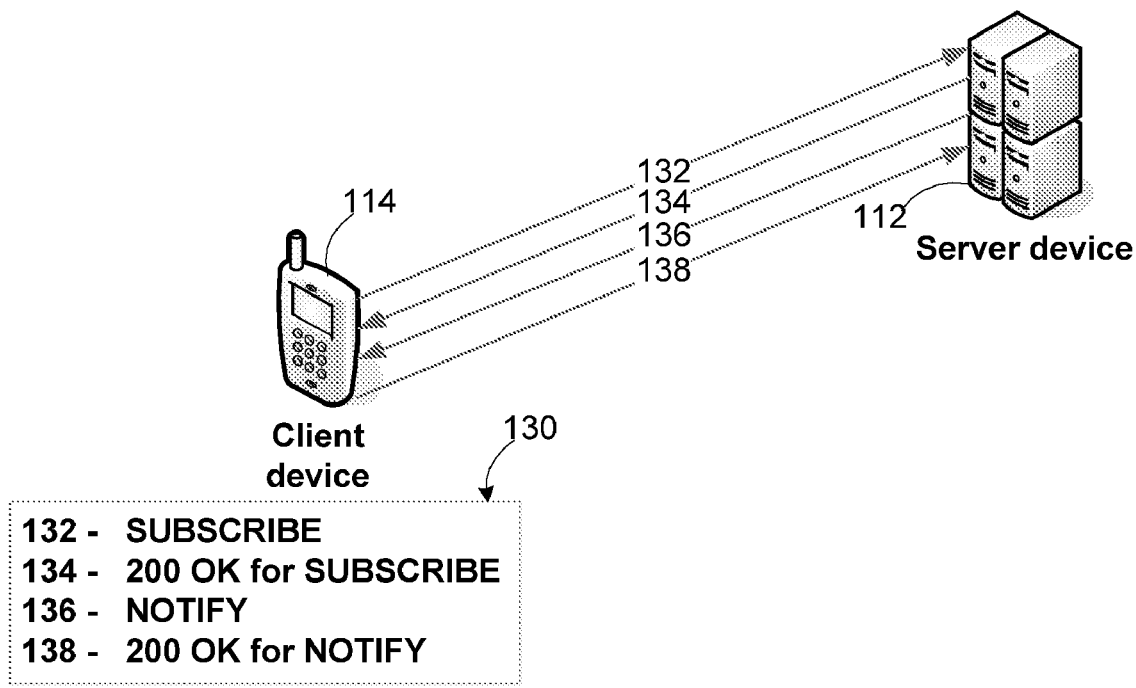
FIG. 7 shows, in block diagram form, an example push-to-talk subscription procedure between a client device and a server device implemented prior to the push-to-talk procedure in the push-to-talk system of FIG. 6.

Reference is now to FIG. 7, which shows a subscription procedure between the server device 112 and a client device 114. Generally, the PTT system 110 provides a subscription-based communications wherein certain information, including media information, may be communicated between the client devices 114 and the server device 112 prior to initiation of the actual PTT session (also referred to as PTT call). Some communications within the PTT system 110 implement the SUBSCRIBE and NOTIFY requests, which are defined in A. B. Roach, "RFC 3265—Session Initiation Protocol (SIP)-Specific Event Notification" (June 2002), the contents of which are herein incorporated by reference.

In some conventional systems, a PTT session is implemented by using INVITE to set a pre-established (or early) session mode. However, such conventional systems using INVITE are limited to the basic request/response functionality provided by INVITE. It is recognized herein that the SIP SUBSCRIBE method and related commands may provide further and additional functionality and flexibility in implementation, as can be appreciated in view of the description below.

Referring still to FIG. 7, a summary of the subscription procedure 130 will now be described, which occurs prior to the PTT call. At step 132, the client device 114 sends a SUBSCRIBE request to the server device 112, including information regarding the push-to-talk group number of the device and the port number of the particular mobile device 114 that is used to receive subsequent message, as well as for receiving a future PTT session. At step 134, the server device 112 provides a 200-OK message (accepting the subscription request). The server device 112 may also reject the subscription request (and/or the subscription request may fail), for example using the 4xx or 5xx family of responses. At step 136, the server device 112 sends a NOTIFY request to the client device 114, with media information including a port number of the media server 176 (FIG. 4) for future PTT sessions originating from the particular client device 114. At step 138, the client device 114 accepts the NOTIFY message by using 200-OK response. Generally, all client devices 114 which are to form part of the PTT group would implement the subscription procedure 130. The server device 112 is therefore informed of the port information of each subscribing client device 114, while each client device is informed of the port information of the media server 176.

Referring now to FIG. 6, a summary of the PTT procedure 140 will now be described. Generally, the PTT procedure 140 is used to establish a PTT call or session from the PTT originator 116 to the PTT receivers 118, 120, 122. The PTT procedure 140 typically occurs after the subscription procedure 130 (FIG. 7), with the media parameters already communicated. At step 142, the PTT originator 116 sends another SUBSCRIBE request (indicated as "RE-SUSCRIBE" for convenience) to the server device 112. At step 144, the server device 112 sends NOTIFY requests to the PTT receivers 118, 120, 122. As will be described in detail below, the NOTIFY request includes an indication of a new "active" state. At step 146, the PTT receivers 118, 120, 122 respond with a 200-OK message if a PTT call is acceptable to be received. A busy message such as 486-Busy may be sent as a response if the particular PTT receiver 118, 120, 122 is busy or not accepting the PTT call. Each PTT receiver 118, 120, 122 which indicated 200-OK further opens its allocated port for receiving media from the media server 76 (FIG. 4), for example Real-Time Transport Protocol (RTP) media, as could be implemented by those skilled in the art. At step 148, the server device 112 sends a 200-OK for the re-subscription message if at least one of the PTT-receivers 118, 120, 122 is not busy. The media server 76 may thereafter open its media port for receiving or listening to media from the PTT originator 116. The PTT originator 116 thereafter starts a media session (e.g. an RTP media session, as could be implemented by those skilled in the art) to the port of the media server 76, with media information previously received in the NOTIFY step 136 (FIG. 7).

Figure 8:
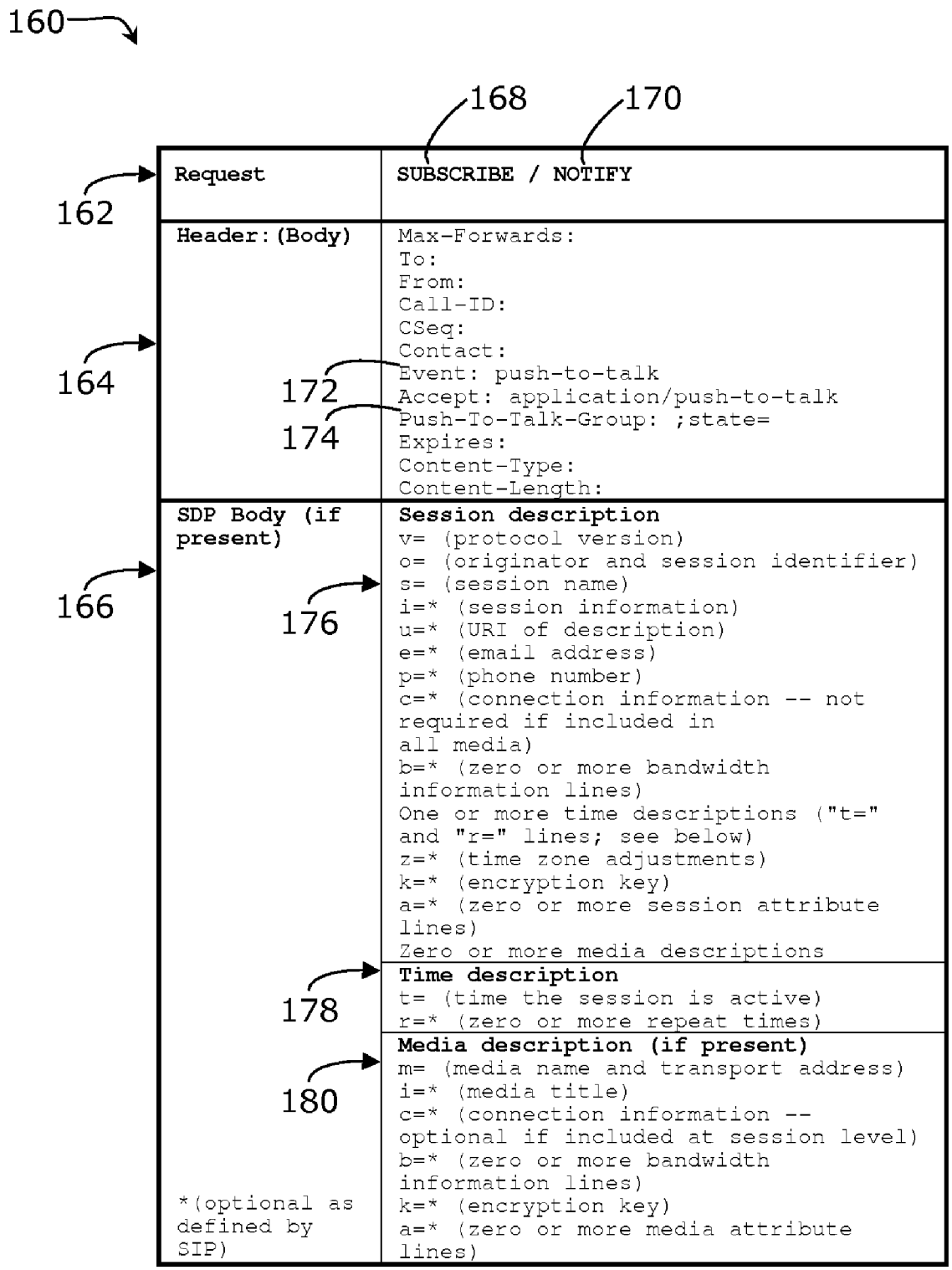
FIG. 8 shows an example message to be used between devices within the push-to-talk procedures of FIGS. 6 to 7.

Detailed example implementations of the subscription procedure 130 and PTT procedure 140 will now be described, with reference to FIG. 8, which shows a general or generic example message template 160 for the SUBSCRIBE and NOTIFY requests. As shown, the message template includes a request 162, request headers 164 and associated body, and a SDP body (if present) 166. As shown, the request 162 may be either a SUBSCRIBE request 168 or a NOTIFY request 170, depending on the particular application and implementation.

The request headers 164 include headers relating to the PTT session information (the SUBSCRIBE or NOTIFY body is not shown here as it is context dependent). The configuration of the particular headers is dependent on the type of message being sent. The request headers 164 include Max-Forwards, To, From, Call-ID, CSeq, Contact, Event, Accept, Push-To-Talk-Group, Expires, Content-Type, and Content-Length. Regarding the "Event:" header 172, RFC 3265 permits the creation and use of "Event packages" which includes the creation of templates, event package responsibilities, parameters, and associated syntax and semantics for the headers 164. Thus, in this particular example a "push-to-talk" event package is provided, and indicated as "Event: push-to-talk" 172 (as shown). The headers 164 may further contain a "Push-To-Talk-Group:" 174 and associated "state=", which are created in the particular Event package. Note that the INVITE does not typically contain or provide for such Event packages.

The SDP body 166 includes parameters relating to session description 176, time description 178, and media description 180. These parameters are described in SIP. As can be appreciated, the SDP body 166 would not be present in some of the requests, such as in the RE-SUSCRIBE 142 and NOTIFY 144 messages (FIG. 6). Further, the media description 180 would not be present in some of the requests, for example when media information is already provisioned in advance of a PTT session. The SDP body 166 as shown may include parameters indicated by an asterisk (*) which are considered optional as defined by SIP (not to be confused with parameters which are optional in the present PTT system 110).

The subscription procedure 130 (FIG. 7) and PTT procedure 140 (FIG. 6) will now be described in greater detail. Reference is now made to FIG. 9, which shows an example message 207 for implementing the SUBSCRIBE step 132 (FIG. 7) in detail. As shown, the message 207 indicates in the header "Event: push-to-talk" 203. The message 207 also contains the "Push-To-Talk-Group" header 204 that indicates a specific PTT group-identifier (ID) which the client device 114 is subscribing to. The message 207 also includes in the body of the "Push-To-Talk-Group" header 204 a current "state" 206 of the client device. For example, the state 206 may be "idle" while available to receive a PTT call, or "active" while wishes to initiate a PTT call. In the present message 207 for subscribing to a PTT group, the state 206 is set to "idle", as shown. The SUBSCRIBE message 100 also includes an "Expires:" header 208, which includes in the body the requested expiry information of the particular subscription to the PTT group. The expiry information is stored by the server device 112 and generally indicates when the subscription to the PTT group is expired, and may be refreshed by subsequent SUBSCRIBE messages.

The message 207 further includes a SDP body 210, which contains media information 212 including port information of the client device 114. In the example shown, the media information 212 is "SDP m-header port number 50000", which is the port number that will be used by the client device 114 for receiving the incoming media when a PTT call is received by the client device 114. For example, port information may include Internet Protocol (IP) port, codec, etc. In some example embodiments, the media information 212 is sent from the server device 112 to the media server 76 for storage by the media server 76 to implement a future media session with the client device 114. In other example embodiments, the media information 212 is stored by the server device 112 and passed on to the media server 76 when the media session starts.

The server device 114 can authenticate this request if needed and either accept or reject the subscription. If the subscription is accepted the server device 112 will send 200-OK response 134 (FIG. 7) to indicate the successful status of the subscription.

The client device 114 can re-subscribe by sending another SUBSCRIBE message to the server device 112 if it wishes update the subscription, for example to modify or update SDP capabilities, expiry, state or ID of the Push-To-Talk-Group.

Reference is now made to FIG. 10, which shows an example message 220 for implementing the NOTIFY step 136 (FIG. 7) in detail. As shown, the NOTIFY message 220 includes the same Call-ID, an incremented CSeq (727 versus 726 as in the SUBSCRIBE message 207), and the same From and To headers. Thus, the NOTIFY message 220 includes some of the same headers 226 as the SUBSCRIBE message 207 (FIG. 9). As shown, the NOTIFY message 220 also includes the same event package, including the header "Event package: push-to-talk" 228 and the header for "Push-To-Talk-Group" 230 as in the original SUBSCRIBE message 207. Once the server device 114 has accepted the subscription of the client device 114 to the particular PTT group, the server device 112 provides to the client device 114 media information 222 of the media server 76. As shown, the SDP body 224 includes the media information 222, including port information of the media server 76 to the client device 114. The client device 114 may store the media information 222 and use the media information 222 to implement a future PTT session when the client device 114 acts as a PTT-Originator 116 (FIG. 6). The specific server device 112 and media server 76 negotiations would be understood by those skilled in the art.

Referring still to FIG. 10, with regards to the Expires header 232 (shown as "Expires: 2900"), the server 112 may reduce the expiration value, and client device 114 must adhere to this new expiration value. In other example embodiments, the server 112 may reply with a SIP-Expires in the header of a 200 OK in response to the SUBSCRIBE command 132.

In some example embodiments, the server device 112 upon receiving of the SUBSCRIBE request (including the expiration value) from client device 114 will start a timer for the present subscription. Once the timer has expired the server device 112 will notify the client device 112 about the terminated/terminating state of the subscription by means of another NOTIFY request.

The client device 112 accepts the provisioning NOTIFY message 220 request by responding with 200-OK 138 (FIG. 7).

In some embodiments, the server device 112 can periodically send updated NOTIFY messages to the client device(s) 114, which may for example include updated SDP information. Thus, the client device 114 may be configured to check for the SDP body in the NOTIFY messages.

Reference is now made to FIG. 11, which shows an example SUBSCRIBE message 240 for implementing the RE-SUBSCRIBE step 142 (FIG. 6) in detail, for initiating the PTT call or session to the PTT group. As shown, the SUBSCRIBE message 240 does not include an SDP body, as the SDP information (including media information) was previously provided in the previous SUBSCRIBE message 207 (FIG. 9). As shown, in the "Push-To-Talk Group" header 242, the "state" 244 is set to "active". This indicates that the particular client device 114 is initiating a PTT session to the PTT receivers 118, 120, 122 in the PTT group and is acting as the PTT originator 116 (FIG. 6). As can be appreciated, using the SUBSCRIBE message 240 to initiate the PTT session would include additional information (such as the event package) when compared to a conventional INVITE message.

After the SUBSCRIBE message 240 has been sent to the server device 112, the PTT-originator 116 can start the media session (such as an RTP-session) to the media information 222, including the media port, that was previously provided in the NOTIFY message 220 (FIG. 10).

The server device 112 checks whether the current state of the PTT group is "idle" and that there is no "active" PTT session. The server device 112 also verifies whether the PTT originator 116 has permission to initiate the PTT session (the floor control functionality of the server device 112 would be understood by those skilled in the art), for example if the "expiry" for the particular subscription has expired. If the request by the PTT originator 116 is acceptable, the server device 112 will mark the PTT group as "active" and follow to the next NOTIFY step 144. Otherwise the request will be rejected by the server device 112 sending to the PTT originator 116 one of the SIP-reject codes (e.g. 486 Busy Here).

Reference is now made to FIG. 12, which shows an example NOTIFY message 260 for implementing the NOTIFY step 144 (FIG. 6). The server device 112 will send the NOTIFY message 260 to all PTT receivers 118, 120, 122 of the PTT group (FIG. 6). The NOTIFY message 260, as shown, indicates the "state" 262 is set to "active". The NOTIFY message 260 is typically sent to those PTT receivers 118, 120, 122 which had previously subscribed to the PTT group (using the subscription procedure 130, FIG. 7) and whose particular subscriptions have not expired, as determined by the server device 112.

If a PTT-Receiver 118, 120, 122 is not willing to accept the PTT call, the PTT-Receiver shall be configured to not receive any RTP session and reject the NOTIFY message 260 request, for example by responding with 486 Busy Here (or 480 Temporary Unavailable) SIP-responses. Otherwise, the PTT-Receiver 118, 120, 122 will open the port (e.g., "listen") which it has allocated for the media session in step 132 (FIG. 7) for receiving the RTP-media. The PTT-Receiver 118, 120, 122 thereafter starts playing (e.g. outputting to a speaker, not shown) the RTP-media received on the port.

Once any one of the PTT receivers 118, 120, 122 sends a 200 OK response to the NOTIFY message 260 request, the server device 112 will send 200 OK (or 202 Accepted) 148 response to the SUBSCRIBE message 240 request (FIG. 11).

It can be appreciated that another client device 114 (such as one of the PTT receivers 118, 120, 122) would not be able to start another PTT session while the current state of the group is "active".

Referring to FIG. 6, in order to terminate a PTT session, the PTT originator 116 sends a new RE-SUBSCRIBE request (using a SUBSCRIBE message similar to SUBSCRIBE message 240, FIG. 11), in this case with the "state" indicated as "idle". The server device 112 will terminate the sessions with the PTT receivers 118, 120, 122 by sending terminating NOTIFY requests (similar to the NOTIFY message 260, FIG. 12) with the "state" indicated as "idle" to all PTT receivers 118, 120, 122. Once the request to terminate the session by the PTT originator 116 is received, the PTT session is considered as terminated and the server device 112 must reset states of the all group members to "idle" regardless of responses received for the terminating NOTIFY requests to the PTT receivers 118, 120, 122.

Referring to FIG. 6, in order for a client device 112 to unsubscribe from the push-to-talk service (or a specific PTT group), the client device 112 must follow an un-subscription procedure, for example as described in RFC 3265, as would be understood by those skilled in the art.

In some example embodiments, the client devices may be designated as dedicated PTT originators or dedicated PTT receivers. Thus, in some of the provisioning message requests, certain media information including media port information would not be included, as such information would not be used by the dedicated PTT originators or dedicated PTT receiver, thereby reducing the size of the required message content.

Certain adaptations and modifications of the described embodiments can be made. Therefore, the above discussed embodiments are considered to be illustrative and not restrictive.

What is claimed is:

1. A method of facilitating push-to-talk (PTT) communications between a server device and a client device using SIP-based messaging, the server device being in communication with a media server, the method comprising:
    receiving in the server device from the client device a SUBSCRIBE message for subscription to a push-to-talk group, the SUBSCRIBE message including media port information of the client device;
    storing in the server device the media port information of the client device; and
    initiating, based on receipt in the server device of a second SUBSCRIBE message for initiating a push-to talk session, a media session between the media server and the client device using the stored media port information.

2. The method of claim 1, further comprising:
    sending from the server device to the device a NOTIFY message, the NOTIFY message including media port information of the media server for storage by the client device.

3. The method of claim 2, further comprising:
    forwarding from the server device to the media server the media port information of the client device.

4. The method of claim 3, further comprising:
    receiving in the server device the second SUBSCRIBE message for initiating the push-to-talk session, the second SUBSCRIBE message excluding media port information.

5. The method of claim 4, further comprising:
    sending from the service device to the client device a second NOTIFY message of the initiation of the push-to-talk session, the second NOTIFY message excluding media port information.

6. The method of claim 2, wherein the SUBSCRIBE or NOTIFY messages include an event package relating to push-to-talk.

7. The method of claim 6, wherein the event package includes state information of the push-to-talk group.

8. The method of claim 7, wherein the state information includes an active state when implementing a PTT session and an idle state otherwise.

9. The method of claim 2, wherein the SUBSCRIBE or NOTIFY message includes expiry information of the push-to-talk group subscription, and the method includes the server device determining whether the subscription of the client device has expired.

10. The method of claim 1, wherein the server device comprises part of an enterprise system.

11. A method of facilitating push-to-talk (PTT) communications between a server device and a client device using SIP-based messaging, the server device being in communication with a media server, the method comprising:
    receiving in the server device from the client device a SUBSCRIBE message for subscription to a push-to-talk group;
    sending from the service device to the client device a NOTIFY message, the NOTIFY message including media port information of the media server for storage by the client device; and
    initiating based on receipt in the server device of a second SUBSCRIBE message for initiating a push-to-talk session, a media session between the media server and the client device using the stored media port information.

12. The method of claim 11 wherein the SUBSCRIBE message includes media port information of the client device, the method including storing in the server device the media port information of the client device.

13. The method of claim 12, further comprising:
    forwarding from the server device to the media server the media port information of the client device.

14. The method of claim 13, further comprising:
    receiving in service device from the client device the second SUBSCRIBE message for initiating the push-to-talk session, the second SUBSCRIBE message excluding media port information.

15. The method of 14, further comprising:
    sending from the server device to further client devices a second NOTIFY message of the initiation of the push-to-talk session, the second NOTIFY message excluding media port information.

16. The method of claim 11, wherein the SUBSCRIBE or NOTIFY messages include an event package relating to push-to-talk.

17. The method of claim 16, wherein the event package includes state information of the push-to-talk group.

18. The method of claim 17, wherein the state information includes an active state when implementing a push-to-talk session and an idle state otherwise.

19. A server device for facilitating push-to-talk (PTT) communications using SIP-based messaging, comprising:
    a memory;
    a controller for accessing the memory;
    a communications module in communication with the controller for communicating with a media server and a client device; and
    the controller being configured to:
    receive from the client device a SUBSCRIBE message for subscription to a push-to-talk group, the SUBSCRIBE message including media port information of the client device,
    store in memory the media port information of the client device,
    send to the client device a NOTIFY message, the NOTIFY message including media port information of the media server for storage by the client device, and
    initiate, based on receipt of a second SUBSCRIBE message for initiating a push-to-talk session, a media session between the media server and the client device using the stored media port information.

20. A system for facilitating push-to-talk (PTT) communications using SIP-based messaging, comprising:
    a media server;
    a server device in communication with the media server;
    at least one PTT receiving client devices, each for sending to the server device a SUBSCRIBE message for subscription to a push-to-talk group, the SUBSCRIBE message including media port information of each of the PTT receiving client devices;
a PTT originator client device for sending to the server device a SUBSCRIBE message for subscription to a push-to-talk group;
the server device being configured to:
store the media port information of the PTT-receiving client devices, and
send to the PTT originator client device a NOTIFY message, the NOTIFY message including media port information of the media server;
the PTT originator client device being configured to store the media port information of the media server; and
the server device being further configured to, upon receipt in the server device from the PTT originator client device of a second SUBSCRIBE message for initiating a push-to-talk session, initiate a media session between the media server and the client devices using the stored media port information.

* * * * *